Patented Dec. 14, 1943

2,336,672

UNITED STATES PATENT OFFICE 2,336,672

PREPARATION OF THERMOSETTING RESIN

William R. Collings, Richard D. Freeman, and Richard M. Upright, Midland, Mich., assignors to The Dow Chemical Company, Midland, Mich., a corporation of Michigan No Drawing. Application August 2, 1940, Serial No. 350,160

11 Claims. (Cl. 260—10)

This invention relates to a new acid-resistant thermo-setting resin material, the preparation thereof, and products molded therefrom.

The present application is a continuation-in-part of our co-pending application, Serial No. 238,814, filed November 4, 1938, which, in turn, is a continuation-in-part of applications Serial Nos. 192,500 and 192,501, filed February 2, 1938.

U. S. Patent No. 1,892,409 describes the partial digestion of wood with an aqueous ammonium phenolate solution at elevated temperatures and pressures, reaction of the digested material with formaldehyde, drainage of the liquid from the solid components of the reaction mass, and drying and molding of the latter. We have found that the so-obtained moldings lack strength and are deficient in resistance to acids and aqueous solutions generally. Further, a long molding time and the use of extreme pressures is necessary to obtain moldings.

It is, accordingly, an object of the present invention to provide a method of partial digestion or pulping of ligno-cellulosic materials with solutions of metallic phenolates to form intermediates adapted to be employed in the production of thermo-setting resins, moldings of which are strong, hard, and resistant to attack by water, acids, and organic solvents.

Further objects will become apparent from the following description of the invention.

We have discovered that a water-insoluble, filled thermo-setting resin material is formed by (1) pulping a ligno-cellulosic material with a hot aqueous solution comprising as active pulping agents inorganic alkali and a water-soluble metal salt of a phenol to obtain a dispersion of cellulose fibers comprising a water-soluble phenolate-lignin complex, (2) reacting an aldehyde with the digestion product to form a water-soluble condensation product, (3) acidifying the resultant mixture to precipitate a thermo-setting resin product on the dispersed cellulose fibers, and (4) separating the solid product so produced.

The word "pulping" as herein employed refers to the breakdown of ligno-cellulosic materials to liberate cellulosic fiber and does not include the complete digestion and solution of such materials. The degree of digestion involved is generally between 40 and 80 per cent by weight of the ligno-cellulosic material employed.

According to the invention, the process is carried out by treating ligno-cellulosic material with a solution comprising alkali and a water-soluble phenolate at a temperature between 150° C. and the decomposition temperature of the mixture, preferably between 170° C. and 180° C. The mixture is preferably agitated while heating under the vapor pressure of the reactants at the temperature used. When the ligno-cellulosic material is pulped, the reaction mixture, comprising the water-soluble phenolate-lignin complex and dispersed cellulose fibers, is cooled, and an aldehyde added thereto. The reaction mixture is then thoroughly agitated for a period of time and at a temperature required to cause reaction of the phenolate-lignin complex with the aldehyde and produce a water-soluble condensation product but insufficient to cause precipitation of the condensation product from solution. Following completion of the aldehyde condensation step, the temperature of the reaction mixture is adjusted to between about 20° and 40° C. and acidified to precipitate thermo-setting resinous material on the cellulose fibers. The filled resin product is separated by any suitable means, for example, by filtration, and washed with water or dilute aqueous alkali to remove salt and acid residues therefrom. The moist resin material is dried at temperatures below 100° C. for a period of time sufficient to reduce the moisture content thereof to below 8 per cent, but insufficient to cause material alteration in the flow characteristics of the product. This dried resin intermediate is then adapted for use in the preparation of a variety of molded products.

Various modifications may be made in the procedure described in the foregoing paragraph. For example, the inorganic alkali may be neutralized wholly or in part before the aldehyde is added to the digestion product. Following the aldehyde condensation step, the acidification of the reaction product may be carried out by pouring such product into an acid solution, in which case the filled resin is obtained in a finely-divided amorphous form. An alternative procedure consists in adding the acid to the condensation product, whereby the resin is precipitated in the form of spongy aggregates.

In carrying out the foregoing procedure, optimum yields of product are obtained when at least 0.005 pound mol of a water-soluble metal salt of a phenol is employed for each pound of dry ligno-cellulosic material digested. Amounts of phenolate up to 0.02 pound mol per pound of ligno-cellulosic material or higher may be employed. Variations in the amount of metallic phenolate employed, provided they be within the stated limits, do not materially affect the rate of digestion of the ligno-cellulosic material according to the present invention. At least 0.005 pound mol of inorganic alkali is employed per pound of ligno-cellulose and from 0.01 to 0.02 pound mol of alkali per pound of ligno-cellulose is preferred. Within these limits, the time required for digesting will ordinarily be between about 1 and 15 hours. Sufficient water should be used in the treating liquor to keep the alkali concentration above about 4 per cent but below about 10 per cent. Further, the ratio of total weight of liquor used to weight of ligno-cellulosic material digested should be within about 5 and 20.

The molding qualities of the filled resins obtained as hereinbefore described depend largely on the conditions of condensation. Resins capable of being satisfactorily molded under moderate conditions of temperature and pressure are obtained when at least 1.25 molar equivalents of aldehyde for each mol of phenolic originally employed is used in the condensation steps. From 2 to 2.5 equivalents of aldehyde for each equivalent of phenolate has been found to be particularly satisfactory. Before adding the aldehyde, the free alkali present in the digestion mixture may be at least partially neutralized to prevent losses through reaction of aldehyde with such alkali. A pH range of from 9 to 10 may be employed during the condensation with temperatures at 75° to 150° C. A preferred temperature range is between 90° and 115° C., at which temperatures the time required for condensation is generally less than two hours.

Woods, such as aspen, birch, maple, basswood, poplar, white pine, and the like, and such lignocellulosic agricultural products as cornstalks, wheat straw, and dried grasses may be employed in the process. Such materials may be in any suitable state of sub-division, e. g., chips, sawdust, finely-ground flour, etc., cured or uncured, oven or air-dried as desired. Ammonium, alkaline earth metal or alkali metal phenolates may be used, e. g., sodium phenolate, potassium phenolate, barium phenolate, sodium ortho-cresolate, barium ortho-cresolate, potassium para-cresolate, sodium xylenolate, ammonium-4-chlorophenolate, potassium-chloro-cresolates, and water-soluble metal salts of technical cresylic acid and wood distillate mixtures. The alkali employed in the digestion liquor is preferably an alkali metal hydroxide such as sodium hydroxide or potassium hydroxide, although ammonium hydroxide may be employed. Substantially, any aldehyde, e. g., acetaldehyde, formaldehyde, butyraldehyde, benzaldehyde, furfuraldehyde, and the like can be employed in the condensation reaction. Any water-soluble organic or inorganic acid is suitable for use in the optional partial neutralization of the digestion liquor or in the acidification of the aldehyde condensation product, e. g., sulfuric acid, hydrochloric acid, nitric acid, acetic acid, waste liquor from the sulphite pulping process, and the like. Acid salts, such as aluminum sulphate, zinc chloride, ammonium sulphate, etc., may be substituted for the free acid.

The thermo-setting and water-insoluble condensation product obtained according to the above-described procedure can be molded to produce an infusible resin having desirable properties. If desired, additional filler and various modifying agents may be incorporated therewith before molding. The filler may be suspended in the liquor after the condensation step before acidification to supplement the function of the dispersed cellulose fibers, or such filler may be incorporated with the thermo-setting condensation product after precipitation. Among the fillers suitable for use are inert fibrous materials and finely-divided mineral substances, such as asbestos fiber, wood flour, sawdust, cotton flock, rubber dust, sisal hemp fibers, diatomaceous earth, bentonite, sand, mica, graphite, etc. Other modifying agents include insoluble soaps, plasticizers, natural resins, pigments, dyes, and the like.

While the temperatures and pressures required for molding the thermo-setting material vary with the particular reactants and amounts thereof employed, and the conditions of temperature and pressure prevailing during the reaction, temperatures from 140° to 160° C. and pressures around 2000 pounds per square inch have been found satisfactory. Molding operations at such temperature and pressure have a cycle of 2 to 5 minutes or more, depending on the size of the article fabricated.

The products prepared, as described above, are substantially insoluble in both hot and cold alcohol and most other common organic solvents, are not decomposed or appreciably swelled by prolonged exposure to water or aqueous sulfuric acid, are substantially odorless, bond well with and are non-corrosive to metals, have a high heat resistance, can be exposed to elevated temperatures without charring, discoloring, or becoming brittle, and have good dielectric properties and high mechanical strength.

The following examples illustrate certain embodiments of the invention but are not to be construed as limiting the same:

*Example 1*

10 pounds of aspen wood, in the form of sawdust, was treated for 5 hours at 175° C. under autogenous pressure with a liquor consisting of 133 pounds of water, 7 pounds of sodium hydroxide, and 16 pounds of sodium phenate, to form a dispersion of cellulose fibers in an aqueous solution of phenolate-lignin complex. The suspended cellulose represented 40 per cent of the original weight of the wood. The reaction mixture was then cooled to 40° C. and adjusted to a pH of 9.5 by addition of hydrochloric acid. 28 pounds of 40 per cent formaldehyde solution was thereafter mixed with the partially acidified reaction product and the mixture heated at 107° C. for 20 minutes to condense the formaldehyde with the phenolate complex present in the digestion product. The resulting water-soluble condensation product was precipitated upon the suspended cellulose fibers by cooling the reaction mass to 30° C. and adding hydrochloric acid with agitation until a pH of 5 was attained. The filled resinous product was filtered off, washed, air-dried, and ground. The flow characteristics of this product according to the method described by Peakes in Plastic Products 10, pages 93 and 132 (1934), are 0.5 inch at 500 pounds per square inch and 150° C. in 35 seconds. Test pieces of dimensions were molded from the resin at 2000 pounds per square inch at 150° C. The molded samples were tested for acid resistance by determining their loss in weight after boiling in 40 per cent sulfuric acid for 6 hours and in 10 per cent sulfuric acid for 24 hours, respectively. In both series of experiments an average loss in weight of 3 per cent was observed. Other samples were tested for resistance to boiling water, and showed an average loss in weight of 2 per cent after refluxing for 24 hours in this medium. The surfaces of the test samples were not appreciably affected by such treatment. At elevated temperatures, the molded articles were found to be difficultly flammable and highly resistant to discoloration, charring, and embrittlement. The molded material was substantially free from odor, had a tensile strength of 3500 pounds per square inch, and an impact strength of 2.4 foot pounds per square inch.

*Example 2*

A filled resin was made from 10 pounds of aspen wood under the conditions described in the above example with the exception that condensation with formaldehyde was carried out at 95° C. for 20 minutes. The washed and dried resin was ground in a planetary disc mill and 70 parts by weight of it were mixed with 30 parts by weight of wood flour in a ball mill to make a molding powder which molded satisfactorily under conditions similar to those used in Example 1.

*Example 3*

A hardwood distillate oil comprising 50–70 per cent by weight of mono- and polyhydric phenols and alkylated and ether derivatives thereof was extracted with dilute sodium hydroxide solution. A quantity of this distillate was mixed with sodium phenolate solution to form 56.4 pounds of solution containing the sodium salts of 6.75 pounds of phenol and 0.75 pound of phenolic derivatives from the hardwood distillate. Sufficient sodium hydroxide was added to this mixture to give a caustic concentration of 7.9 per cent. This solution was treated with 5 pounds of aspen hog chips under autogenous pressure at 180° C. for 4 hours. The partially-digested mixture was thereafter treated as described in Example 1 with the exception that only 13.3 pounds of 40 per cent formaldehyde was used in the condensation step. The resulting filled resin molded readily at 150° C. under 500 pounds per square inch pressure and showed a flow characteristic of 1.22 inches. Under these conditions of temperature and pressure, the resin test pellet set to a hard, infusible mass in 35 seconds.

We claim:

1. A process for the preparation of a thermosetting resin composition which comprises the steps of pulping a ligno-cellulosic material under alkaline conditions and below the decomposition temperature of the mixture with a hot aqueous liquor comprising alkali and a water-soluble phenolate of the group consisting of the alkali metal, alkaline earth metal, and ammonium phenolates as active pulping agents to form a suspension of cellulosic fibers in a solution comprising a phenolate-lignin complex, cooling, adding an aldehyde to the reaction mixture, heating the mixture for a sufficient time to cause reaction of the aldehyde with the phenolate complex but insufficient to cause precipitation, and acidifying the mixture to precipitate a thermo-setting resin product upon the suspended fibers.

2. A process for the preparation of a thermosetting resin composition which comprises the steps of pulping a ligno-cellulosic material under alkaline conditions and below the decomposition temperature of the mixture with a hot aqueous liquor comprising alkali and a water-soluble phenolate of the group consisting of the alkali metal, alkaline earth metal, and ammonium phenolates as active pulping agents to form a suspension of cellulosic fibers in a solution comprising a phenolate-lignin complex, cooling, adding an aldehyde to the reaction mixture, heating the mixture at a temperature below 150° C. for a sufficient time to cause reaction of the aldehyde with the phenolate complex but insufficient to cause precipitation, acidifying the mixture to precipitate a thermo-setting resin product upon the suspended fibers, and separating and drying the precipitate.

3. A process for the preparation of a thermosetting resin composition which comprises the steps of pulping a ligno-cellulosic material under alkaline conditions and below the decomposition temperature of the mixture with a hot aqueous liquor comprising alkali and a water-soluble phenolate of the group consisting of the alkali metal, alkaline earth metal, and ammonium phenolates as active pulping agents to form a suspension of cellulosic fibers in a solution comprising a phenolate-lignin complex, cooling, adding an aldehyde to the reaction mixture, heating the mixture at a temperature below 150° C. for a sufficient time to cause reaction of the aldehyde with the phenolate complex but insufficient to cause precipitation, adding a filler, acidifying the mixture to precipitate a thermo-setting resin product upon the suspended solids, and separating and drying the precipitate.

4. A process for the preparation of a thermoset molding which comprises the steps of pulping a ligno-cellulosic material under alkaline conditions and below the decomposition temperature of the mixture with a hot aqueous liquor comprising alkali and a water-soluble phenolate of the group consisting of the alkali metal, alkaline earth metal, and ammonium phenolates as active pulping agents to form a suspension of cellulosic fibers in a solution comprising a phenolate-lignin complex, cooling, adding an aldehyde to the reaction mixture, heating the mixture at a temperature below 150° C. for a sufficient time to cause reaction of the aldehyde with the phenolate complex but insufficient to cause precipitation, acidifying the mixture to precipitate a thermo-setting resin product upon the suspended fibers, and separating and drying the precipitate and molding the same by subjecting said material to heat and pressure.

5. A process for the preparation of a thermosetting resin composition which comprises the steps of pulping a ligno-cellulosic material at 150°–180° C. under alkaline conditions and autogenous pressure with aqueous liquor comprising alkali and a water-soluble phenolate of the group consisting of the alkali metal, alkaline earth metal, and ammonium phenolates as active pulping agents to form a suspension of cellulosic fibers in a solution comprising a phenolate-lignin complex, cooling, adding an aldehyde to the reaction mixture, heating the mixture at a temperature below 150° C. for sufficient time to cause reaction of the aldehyde with the phenolate complex but insufficient to cause precipitation, acidifying the mixture to precipitate a thermo-setting resin product upon the suspended fibers, separating and drying the precipitate.

6. A process for the preparation of a thermosetting resin composition which comprises the steps of pulping a ligno-cellulosic material at 150°–180° C. under autogenous pressure with an aqueous liquor comprising alkali and a water-soluble phenolate of the group consisting of the alkali metal, alkaline earth metal, and ammonium phenolates in relative amounts such that the ratio of the pound-moles of alkali and of phenolate to pounds of ligno-cellulosic material in the digestion mixture both lie between the limits 0.005 and 0.02, cooling, adding an aldehyde to the reaction mixture, heating the mixture at a temperature below 150° C. for sufficient time to cause reaction of the aldehyde with the phenolate complex but insufficient to cause precipitation, acidifying the mixture to precipitate a thermo-setting resin product upon the suspended fibers and separating and drying the precipitate.

7. A process for the preparation of a thermo-setting resin composition which comprises the steps of pulping a ligno-cellulosic material at 150°–180° C. with an aqueous liquor comprising sodium hydroxide and water-soluble phenolate of the group consisting of the alkali metal, alkaline earth metal, and ammonium phenolates in relative amounts such that the ratio of the pound-moles of sodium hydroxide and of phenolate to pounds of ligno-cellulosic material in the digestion mixture both lie between the limits 0.005 and 0.02, cooling, partially neutralizing the excess alkali, adding an aldehyde to the reaction mixture, heating the mixture at a temperature below 150° C. for sufficient time to cause reaction of the aldehyde with the phenolate complex but insufficient to cause precipitation, acidifying the mixture to precipitate a thermo-setting resin product upon the suspended fibers, and separating and drying the precipitate.

8. A process for the preparation of a thermo-setting resin composition which comprises the steps of pulping a ligno-cellulosic material at 150°–180° C. with an aqueous liquor comprising sodium hydroxide and water-soluble phenolate of the group consisting of the alkali metal, alkaline earth metal, and ammonium phenolates in relative amounts such that the ratio of the pound-moles of sodium hydroxide and of phenolate to pounds of ligno-cellulosic material in the digestion mixture both lie between the limits 0.005 and 0.02, cooling, partially neutralizing the excess sodium hydroxide to a pH of between 9 and 10, adding an aldehyde to the reaction mixture, heating the mixture at a temperature below 150° C. for sufficient time to cause reaction of the aldehyde with the phenolate complex but insufficient to cause precipitation, acidifying the mixture to precipitate a thermo-setting resin product upon the suspended fibers, and separating and drying the precipitate.

9. A process for the preparation of a thermo-setting resin composition which comprises the steps of pulping a ligno-cellulosic material at 150°–180° C. with an aqueous liquor comprising sodium hydroxide and sodium phenolate in relative amounts such that the ratio of the pound-moles of sodium hydroxide and of phenolate to pounds of ligno-cellulosic material in the digestion mixture both lie between the limits 0.005 and 0.02, cooling, partially neutralizing the excess alkali to a pH of between 9 and 10, adding an aldehyde in amount sufficient to provide a molar ratio of aldehyde to phenol present of from 2.0 to 2.5, heating the mixture at a temperature below 150° C. for sufficient time to cause reaction of the aldehyde with the phenolate complex but insufficient to cause precipitation, acidifying the mixture to precipitate a thermo-setting resin product upon the suspended fibers, and separating and drying the precipitate.

10. A process for the preparation of a thermo-setting resin composition which comprises the steps of pulping a ligno-cellulosic material at 150°–180° C. with an aqueous liquor comprising sodium hydroxide and sodium phenolate in relative amounts such that the ratio of the pound-moles of sodium hydroxide and of phenolate to pounds of ligno-cellulosic material in the digestion mixture both lie between the limits 0.005 and 0.02, partially neutralizing the excess alkali to a pH of between 9 and 10, cooling, adding an aldehyde in amount sufficient to provide a molar ratio of aldehyde to phenol present of from 2.0 to 2.5, heating at a temperature of from 90° to 110° C. for sufficient time to cause reaction of the aldehyde with the phenolate complex but insufficient to cause precipitation, acidifying the mixture to precipitate a thermo-setting resin product upon the suspended fibers, and separating and drying the precipitate.

11. A process for the preparation of a thermo-setting resin composition which comprises the steps of pulping a ligno-cellulosic material at 150°–180° C. with an aqueous liquor comprising sodium hydroxide and sodium phenolate in relative amounts such that the ratio of the pound-moles of sodium hydroxide and of phenolate to pounds of ligno-cellulosic material in the digestion mixture both lie between the limits 0.005 and 0.02, partially neutralizing the excess alkali to a pH of between 9 and 10, cooling, adding an aldehyde in amount sufficient to provide a molar ratio of aldehyde to phenol present of from 2.0 to 2.5, heating at a temperature of from 90° to 110° C. for sufficient time to cause reaction of the aldehyde with the phenolate complex but insufficient to cause precipitation, adding filler, acidifying the mixture to precipitate a thermo-setting resin product upon the suspended solids, and separating and drying the filled resin product.

WILLIAM R. COLLINGS.
RICHARD D. FREEMAN.
RICHARD M. UPRIGHT.